United States Patent
Handley

(10) Patent No.: US 10,238,027 B2
(45) Date of Patent: Mar. 26, 2019

(54) BLADE REMOVING TOOL

(71) Applicant: Gregory Handley, Crestview, FL (US)

(72) Inventor: Gregory Handley, Crestview, FL (US)

( * ) Notice: Subject to any disclaimer, the term of this patent is extended or adjusted under 35 U.S.C. 154(b) by 36 days.

(21) Appl. No.: 15/271,343

(22) Filed: Sep. 21, 2016

(65) Prior Publication Data

US 2017/0095914 A1    Apr. 6, 2017

Related U.S. Application Data

(60) Provisional application No. 62/237,651, filed on Oct. 6, 2015.

(51) Int. Cl.
*B25B 9/00* (2006.01)
*B25G 1/04* (2006.01)
*A01D 34/73* (2006.01)

(52) U.S. Cl.
CPC ............... *A01D 34/733* (2013.01); *B25B 9/00* (2013.01); *B25G 1/043* (2013.01)

(58) Field of Classification Search
CPC ........... B25B 9/00; B25B 13/48; B25G 1/043; Y10T 29/53909
USPC ........................................ 81/487–488; 30/322
See application file for complete search history.

(56) References Cited

U.S. PATENT DOCUMENTS

| | | | | |
|---|---|---|---|---|
| 1,202,120 A | * | 10/1916 | Stuckel | B65G 7/12 |
| | | | | 294/26 |
| 1,463,077 A | * | 7/1923 | Gandell | B25G 1/043 |
| | | | | 81/177.2 |
| 1,511,738 A | * | 10/1924 | Lownsbery | B25G 1/043 |
| | | | | 16/429 |
| 1,643,027 A | * | 9/1927 | Morgan | B25G 1/025 |
| | | | | 81/177.2 |
| 2,539,849 A | * | 1/1951 | Lum | A47G 21/023 |
| | | | | 294/61 |
| 2,604,350 A | * | 7/1952 | Taylor | A47J 43/283 |
| | | | | 294/26 |
| 3,122,354 A | * | 2/1964 | Rodcback | B65H 49/327 |
| | | | | 254/131 |
| 3,162,475 A | * | 12/1964 | Van Allen | A47G 21/023 |
| | | | | 294/26 |
| D268,561 S | * | 4/1983 | Risser | 294/26 |
| 4,564,991 A | * | 1/1986 | Taylor | A01D 34/001 |
| | | | | 254/131 |
| 4,644,600 A | * | 2/1987 | Fugate | B25B 27/02 |
| | | | | 7/166 |
| 4,882,960 A | | 11/1989 | Kugler | |

(Continued)

*Primary Examiner* — Tyrone V Hall, Jr.
(74) *Attorney, Agent, or Firm* — Argus Intellectual Enterprise; Jordan Sworen; Daniel Enea

(57) ABSTRACT

A tool for preventing a lawnmower blade from rotating while the blade is attached to a lawnmower. The tool includes an elongated shaft having a first end and an opposing second end. A first and second hook extend from the first end of the shaft, wherein the first hook is disposed in a first direction and the second hook is disposed in a second direction. The first direction opposes the second direction and the first hook is offset from the second hook, such that there is a space between the first and second hook. The space between the hooks allows for a lawnmower blade to be received therebetween. The second end of the elongated shaft can be grasped by a user in order to manipulate the placement of the hooks relative to the lawnmower blade.

6 Claims, 2 Drawing Sheets

(56) References Cited

U.S. PATENT DOCUMENTS

| | | | | |
|---|---|---|---|---|
| 4,934,037 A | * | 6/1990 | Schuerg | B25B 5/14 269/287 |
| 4,956,905 A | | 9/1990 | Davidson | |
| 4,960,014 A | * | 10/1990 | Kelley | B25G 1/005 294/209 |
| D328,017 S | * | 7/1992 | Boeke | D8/21 |
| D394,992 S | * | 6/1998 | Landin | D8/14 |
| 5,813,120 A | * | 9/1998 | Stroh | A47J 37/0786 294/26 |
| 5,832,794 A | * | 11/1998 | Fowler | B25B 13/08 81/177.2 |
| 5,896,668 A | * | 4/1999 | Murrell | A47J 43/18 294/26 |
| 6,267,030 B1 | * | 7/2001 | Rodoni | B25G 1/043 81/166 |
| 6,308,596 B1 | * | 10/2001 | Williams | B25G 1/043 81/177.1 |
| 6,536,118 B1 | * | 3/2003 | Campbell | A47J 43/283 294/26 |
| D476,203 S | * | 6/2003 | Mahan | D8/21 |
| 7,065,883 B2 | * | 6/2006 | Popeil | A47J 43/283 294/26 |
| D540,128 S | * | 4/2007 | Pontzious | D7/683 |
| D598,257 S | * | 8/2009 | Darby | D8/27 |
| 7,610,740 B2 | | 11/2009 | Myers | |
| D630,481 S | * | 1/2011 | Hutt | D8/27 |
| 8,209,837 B1 | | 7/2012 | Henshaw | |
| 9,752,348 B2 | * | 9/2017 | Leach | E05B 1/0053 |
| 2001/0035077 A1 | | 11/2001 | Adams | |
| 2001/0035080 A1 | * | 11/2001 | Adams | B25B 9/00 81/488 |
| 2004/0025649 A1 | * | 2/2004 | Rugee | B25G 1/043 81/177.2 |
| 2005/0183550 A1 | * | 8/2005 | Day | B25G 1/043 81/177.2 |
| 2005/0279193 A1 | * | 12/2005 | Darby | B25G 1/04 81/177.2 |
| 2013/0233134 A1 | * | 9/2013 | Humphrey | B25G 1/043 81/177.2 |

* cited by examiner

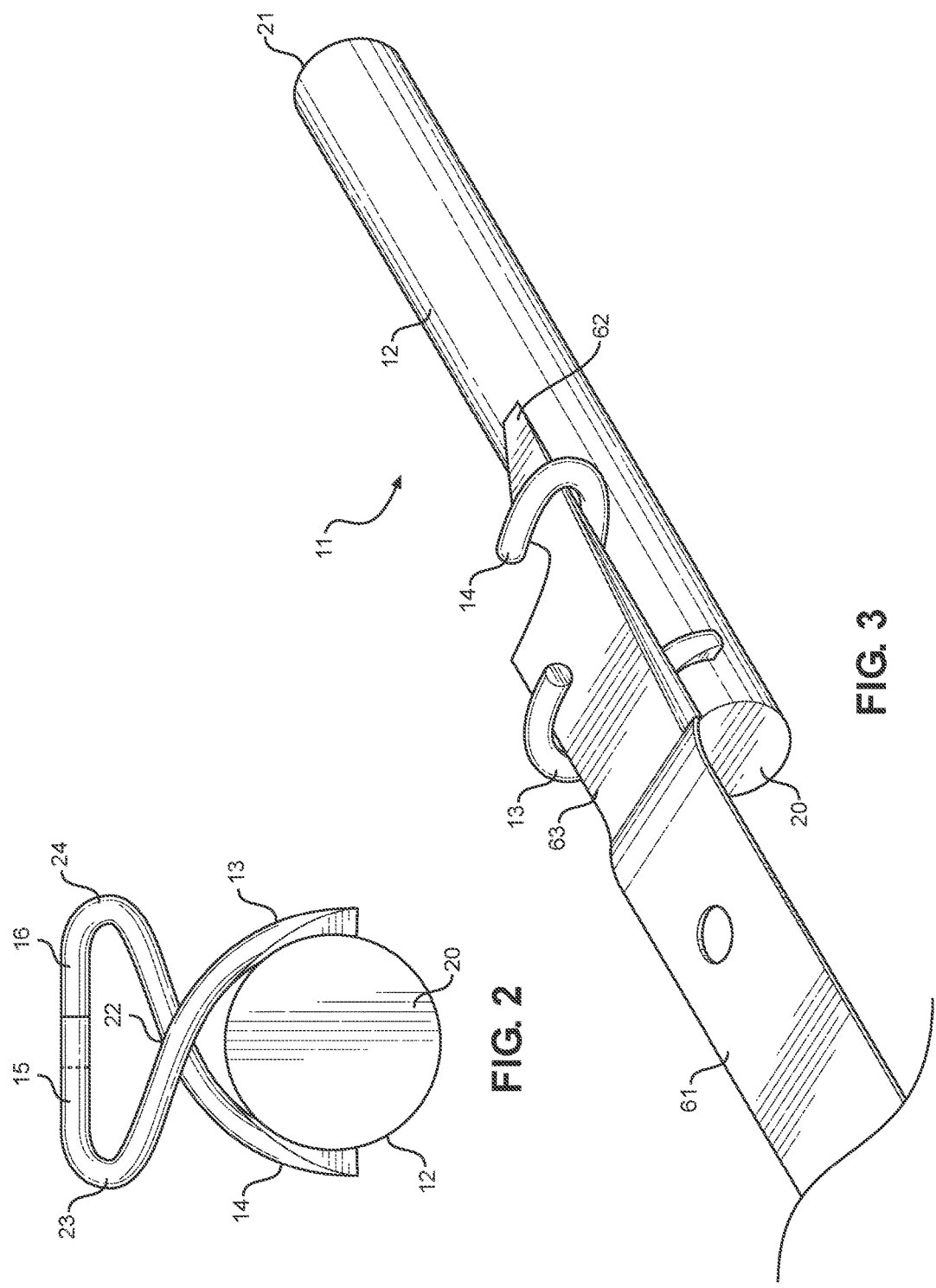

BLADE REMOVING TOOL

CROSS REFERENCE TO RELATED APPLICATION

This application claims the benefit of U.S. Provisional Application No. 62/237,651 filed on Oct. 6, 2015. The above identified patent application is herein incorporated by reference in its entirety to provide continuity of disclosure.

BACKGROUND OF THE INVENTION

The present invention relates to blade removing tools. More specifically, the present invention provides an elongated shaft having a pair of hooks extending in opposing directions, wherein the first hook is offset from the second hook so as to receive a blade of a lawnmower therebetween.

The blades on the underside of the deck of a lawnmower are often too short to securely grasp by reaching under the deck in order to remove the blades. Furthermore, there is very little space between the deck surface and the blade so a person is prohibited from inserting an object beneath the deck for leverage in order to loosen the blade. Removing the blades of a lawnmower without a proper tool, or having to lift the lawnmower in order to access the blades, can lead to serious injury. The length of a lawnmower blade is typically measured from corner to corner and range from approximately six inches to thirty-two inches. The blade can range from one and a half inches in width and from a tenth to a third of an inch in thickness. Therefore, there exists a need for a tool that can engage various sized lawnmower blades and assist a user to remove a lawnmower blade without the need to grasp the blade with his or her hand.

Devices have been disclosed in the known art that relate to blade removing tools. These devices generally relate to a blade gripping mechanism having a pair of parallel arms facing the same direction. These known art devices have several known drawbacks. These devices fail to include a pair of hooks offset from one another and facing opposing directions, such that the hooks can securely receive a lawnmower blade therebetween without having to lift the lawnmower to access the blades under the deck thereof.

In light of the devices disclosed in the known art, it is submitted that the present invention substantially diverges in design elements from the prior art and consequently it is clear that there is a need in the art for an improvement to existing blade removing tools. In this regard the instant invention substantially fulfills these needs.

SUMMARY OF THE INVENTION

In view of the foregoing disadvantages inherent in the known types of blade removing tools now present in the prior art, the present invention provides a new blade removing tool wherein the same can be utilized for providing convenience for the user when removing the blades of a lawnmower.

It is therefore an object of the present invention to provide a new and improved blade removing tool that has all of the advantages of the prior art and none of the disadvantages.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2 shows a front view of the first end of the blade removing tool.

FIG. 3 shows a perspective view of the blade removing tool in use.

DETAILED DESCRIPTION OF THE INVENTION

Figure 1:
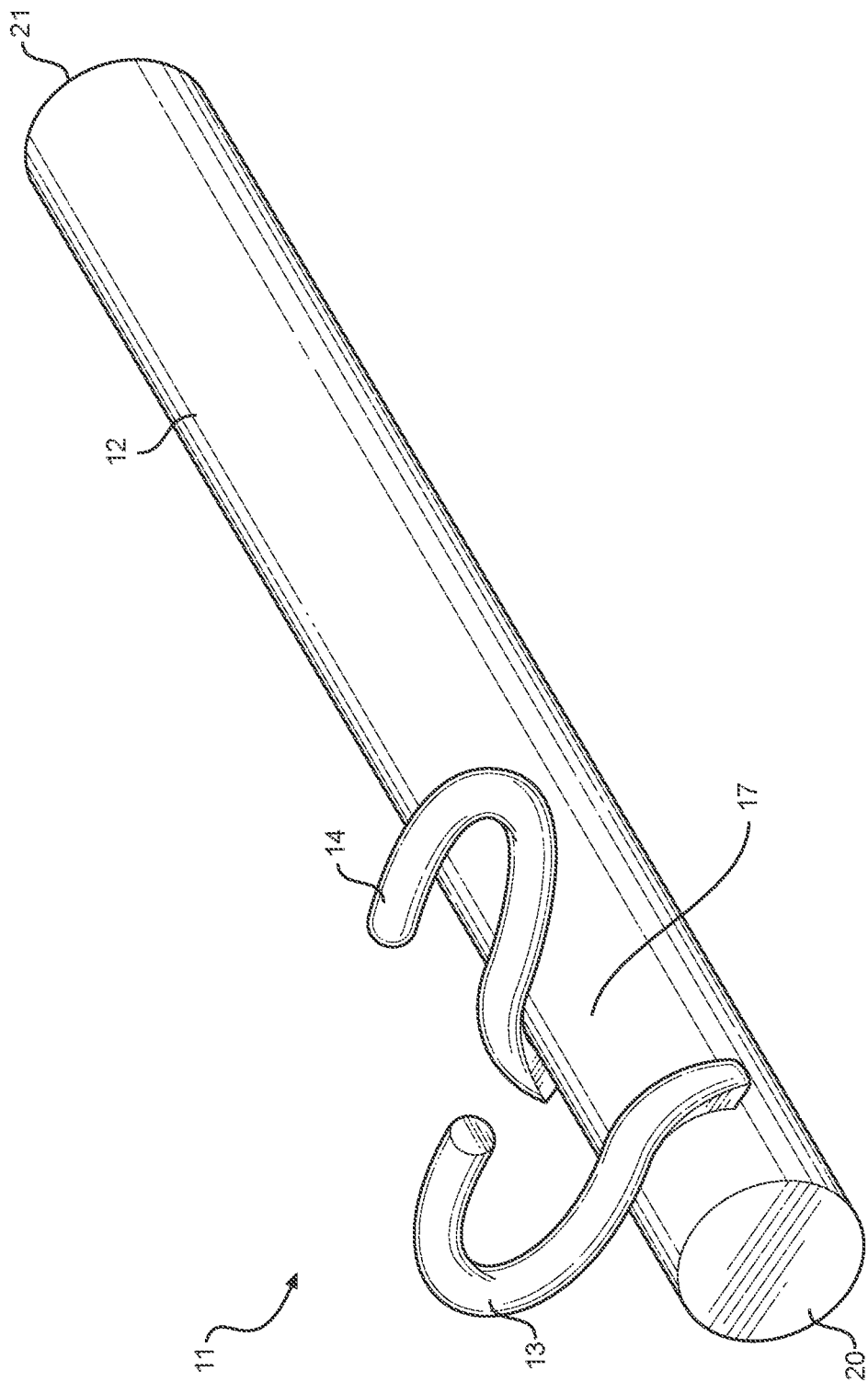
FIG. 1 shows a perspective view of the blade removing tool.

Reference is made herein to the attached drawings. Like reference numerals are used throughout the drawings to depict like or similar elements of the blade removing tool. For the purposes of presenting a brief and clear description of the present invention, the preferred embodiment will be discussed as used for securing to the blade of a lawnmower and preventing movement thereof. The figures are intended for representative purposes only and should not be considered to be limiting in any respect.

Referring now to FIG. 1, there is shown a perspective view of the blade removing tool. The blade removing tool 11 comprises an elongated shaft 12 having a first end 20 and an opposing second end 21. The second end 21 of the shaft 12 is adapted to be grasped by a user. In the illustrated embodiment, the elongated shaft 12 comprises a circle shaped cross section. In alternate embodiments the shaft 12 comprises any suitable shaped cross section configured to allow a user to grasp the second end 21 thereof. The shaft 12 comprises a length, wherein the length is measured from the first end 20 to the second end 21, configured to allow the second end 21 of the shaft 12 to extend beyond a deck of a lawnmower when the first end 20 is secured to a blade attached to the underside of the deck. In this way, the first end 20 is disposed beneath the lawnmower deck and the second end 21 can be grasped by a user. In the illustrated embodiment, the shaft 12 is approximately thirty inches in length.

A pair of hooks 13, 14 extend from the first end 20 of the elongated shaft 12 and are adapted to removably secure to a blade of a lawnmower so as to prevent the blade from rotating when attached to the deck of a lawnmower. The first hook 13 is disposed in a first direction and the second hook 14 is disposed in a second direction, such that the first and second direction are opposite one another. The pair of hooks 13, 14 are offset from one another, such that the first hook 13 is positioned closer to the first end 20 of the shaft 12 than the second hook 14. The offset positioning of the hooks 13, 14 relative to one another creates a space 17 therebetween, along the length of the shaft 12.

The space 17 between the hooks 13, 14 allows for the lawnmower blade to be received between the first and second hooks 13, 14. The opposite facing hooks 13, 14 prevents the blade from rotating once received between the hooks 13, 14. In the illustrated embodiment, the space 17 is approximately four inches between the first hook 13 and the second hook 12. The space 17 is configured to receive various sized blades between the hooks 13, 14.

Referring now to FIG. 2, there is shown a front view of the first end of the blade removing tool. Each hook 13, 14 comprises a curved member 23, 24 and a liner upper section 15, 16, respectively. The curved members 23, 24 are configured to contact opposing sides of the blade and serve as a barrier to prevent the blade from rotating. A portion of the linear upper section 15 of the first hook 13 is aligned in the same plane with a portion of the linear upper section 16 of the second hook 14. The aligned linear upper sections 15, 16 prevent a blade from being lifted away from the shaft 12 in a direction perpendicular to the liner upper sections 15, 16.

In the illustrated embodiment, the first hook 13 and the second hook 14 intersect at point 22 when viewed from the first end view. The first hook 13, between point 22 and the curved member 23, is arranged at a 17.5 degree angle with respect to a horizontal plane that intersects point 22 and is parallel to the longitudinal axis of the shaft 12. In the illustrated embodiment, the longitudinal axis of the shaft 12 is between the first end and the second end 21. The second hook 14, between point 22 and the curved member 24, is arranged at a 17.5 degree angle with respect to a horizontal plane that intersects point 22 and is parallel to the longitudinal axis of the shaft 12. The first hook 13 between point 22 and the curved member 23 and the second hook 14 between point 22 and the curved member 24, are arranged at one hundred and forty-five degree angle with respect to each other. It is appreciated that many angles are provided herein and are exemplary of a preferred embodiment of the present invention. The angles may deviate or change a small amount without departing from the broad aspects of the present invention. Further, it should be stated that a change in one of the angles may determine a corresponding change in related angles. In other embodiments, the angle between the first hook 13 and the second hook 14 is between 160 degrees to 90 degrees. The angle allows various lawnmower blades to fit between the first and second hook 13, 14, while remaining secured within the curved portion Referring now to FIG. 3, there is shown a perspective view of the blade removing tool in use. The second end 21 of the elongated shaft 12 can be grasped by a user in order to manipulate the placement of the hooks 13, 14 relative to the lawnmower blade 61. When the blade 61 is engaged by the blade removing tool 11, an upper corner 62 of the blade 61 is forced against the interior of the second hook 14 and an opposite, lower corner 63 of the blade 61 is forced against the interior of the first hook 13 by the torque applied by a user on the second end 21 of the shaft 12.

In operation, a user positions the first end 20 of the shaft 12 beneath the deck of the lawnmower and manipulates the second end 21 such that the blade 61 is forced against the first hook 13. The user rotates the shaft 12 to engage the second hook 14 such that the opposing side of the blade 61 is forced thereagainst. The user may then safely remove the mounting bolts of the lawnmower blade 61 because the blade removing tool 11 prevents the lawnmower blade 61 from rotating. The blade removing tool 11 is configured to engage the lawnmower blade 61 without the need to jack, or otherwise lift, the front of the lawnmower.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A blade removing tool, comprising:
   an elongated shaft having a first end and a second end;
   a first hook extending in a first direction from the first end of the elongated shaft and a second hook extending in a second direction from the first end of the elongated shaft;
   wherein the first direction opposes the second direction and the first hook is offset from the second hook, such that a space between the first and second hooks is configured to receive a lawnmower blade therebetween;
   wherein the first and second hook each comprise a linear upper section and a curved member, wherein the linear upper section of the first hook is aligned in a same plane as a linear upper section of the second hook;
   wherein the first hook is positioned closer to a terminal end of the elongated shaft than the second end;
   wherein the elongated shaft forms a linear axis between the first end and the second end, the first hook and the second hooks configured to receive the lawnmower blade along the linear axis;
   a bisecting plane disposed along the linear axis forming a first side and a second side, wherein the first hook extends from the second side and the curved member of the first hook forms an acute interior angle on the first side, the linear upper section of the first hook terminating on the second side;
   wherein the second hook extends from the first side of the elongated shaft and the curved member of the second hook forms an acute interior angle on the second side, the linear upper section of the second hook terminating on the first side;
   wherein the linear upper section is parallel to the linear axis of the elongated shaft;
   wherein an interior angle between the first hook and the second hook along a central point of the bisecting plane is between 160 degrees and 90 degrees.

2. The blade removing tool of claim 1, wherein the elongated shaft comprises a length configured to extend longer than a radius of a lawnmower deck, wherein the length of the elongated shaft is measured from the first end to the second end.

3. The blade removing tool of claim 2, wherein the elongated shaft comprises a length of thirty inches.

4. The blade removing tool of claim 1, wherein a length between the first hook and second hook is no longer than four inches.

5. The blade removing tool of claim 1, wherein an angle between the first hook and second hook is one hundred and forty-five degrees.

6. The blade removing tool of claim 1, wherein the elongated shaft comprises a uniform cross-section entirely between the first end and second end thereof.

* * * * *